United States Patent Office 3,413,782
Patented Dec. 3, 1968

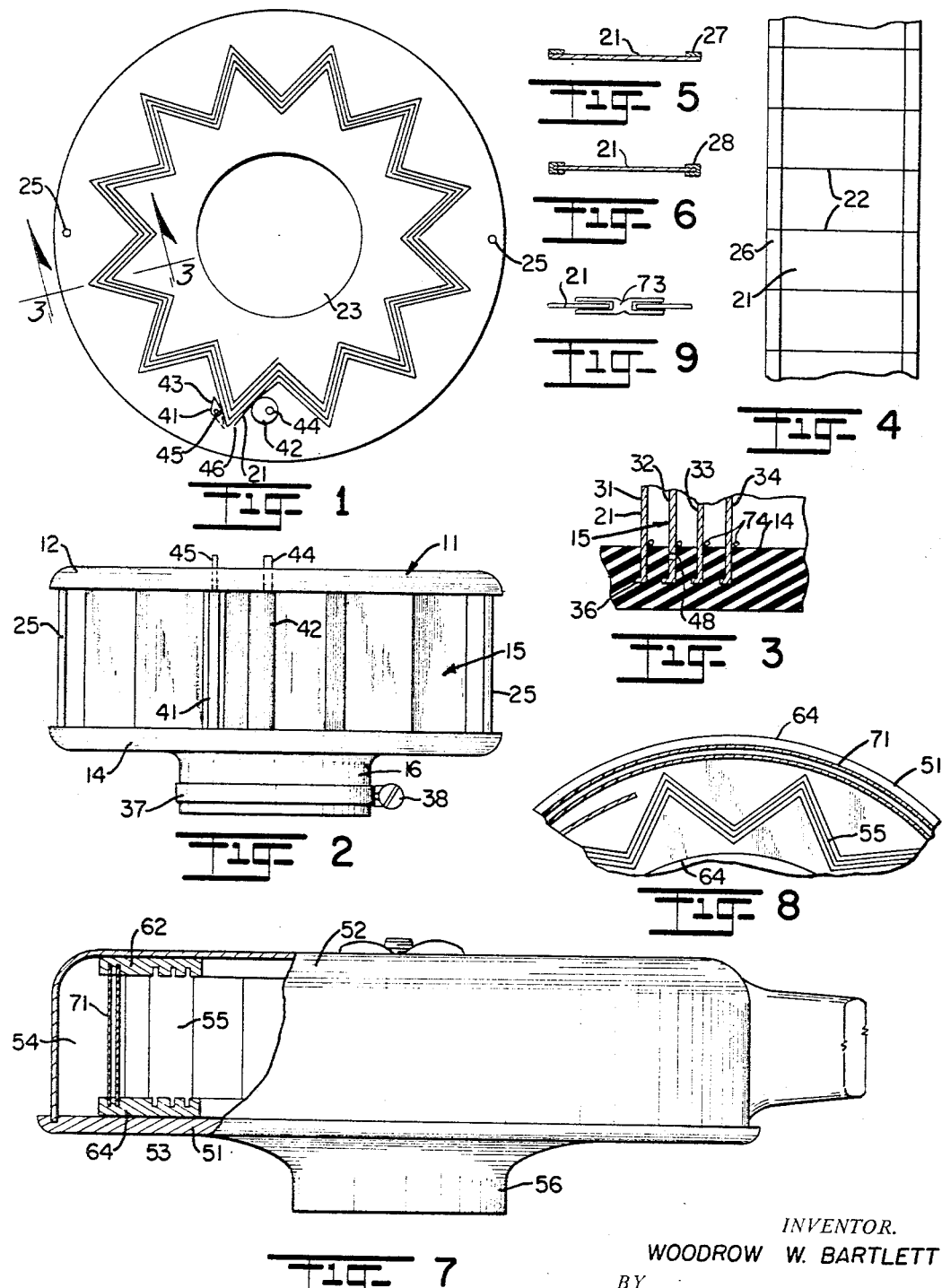

3,413,782
AUTOMOTIVE AIR FILTER
Woodrow W. Bartlett, Salt Lake City, Utah, assignor to Gem Corporation, a corporation of Utah
Filed June 7, 1966, Ser. No. 555,750
10 Claims. (Cl. 55—485)

ABSTRACT OF THE DISCLOSURE

An automotive air filter of the type used on the carburetor or other air intake of internal combustion engines to prevent the ingestion of dust and dirt constructed so that successive outer layers of filter membrane which become clogged can be removed to expose a still unclogged membrane therebeneath with pressure exerting means for closing off any potential alternate passages past the end of the severed filter membrane and along a path between the layers of filter medium. The invention further provides molded structural supports in air excluding contact with opposed side edges of each layer of said filter membrane and at least one filter unit configuration in which the structural supports are the main support elements of a filter adapted for use on engine carburetors.

---

Primarily, the invention is intended for use on replaceable cartridge air filters of near conventional construction using convoluted paper as a filter element, though the invention is applicable to other filter mediums and other types of filters that are used in air systems or with other fluid mediums. The invention is further directed to the provision of a complete filtration unit which may, by reason of its simplicity and economy of construction, be considered disposable.

Among the specific objects of the invention is to provide a fluid filter designed so that the fluid medium to be filtered must pass through multiple layers of the filter medium and of such construction that exterior layers may be removed when they become clogged.

A main object in connection with the described function is to provide means facilitating the removal of the exterior layers of the filter which may have become clogged through use.

Another object of the invention is to provide a system whereby an exterior layer of filter medium may be removed without opening an alternate filter bypassing fluid passage.

A further object of the invention is to provide a strip type filter medium of increased or reinforced strength so that the filter medium may be pulled away from its engaged position in the filter unit or filter cartridge.

Another object is to provide a filter medium having a reinforced edge that may be engaged to provide an efficient sealed filter construction and which further facilitates the selective removal of exterior filter medium layers that may become clogged.

A further object of the invention is to provide a complete filtration unit in which mold formed structural components engage and hold the separate layers of a multilayer filter medium individually.

Another and related objective is to provide a complete filter unit of the foregoing type that is made to facilitate the removal of separate exterior layers of the filter medium.

A further object of the invention is to provide a filtration unit in which the main structural components are mold formed of a resinous plastic or rubber type compound and in which a secure bond is obtained between the mold formed components and each of the separate layers of a multi-layer filter medium.

Further objects and advantages of the present invention will be apparent from the appended description and drawings, in which:

FIG. 1 is a plan view in partial section showing construction features of a replaceable filtration unit.

FIG. 2 is a side elevation of the embodiment shown in FIG. 1,

FIG. 3 is a cross-sectional partial elevation taken along the line 3—3 of FIG. 1, FIG. 4 is a layout representation of a type of filter medium, FIG. 5 shows one form of edge reinforcing for a filter medium, FIG. 6 shows an alternate form of edge reinforcing, FIG. 7 is a side elevation in partial cross-section showing construction features of a replaceable cartridge type of air filter incorporating features of this invention, FIG. 8 is a partial plan view illustrating further features of the construction shown in FIG. 7, and FIG. 9 is an end view of a filter medium end clip.

Briefly stated, the present invention provides different types of air filters that are constructed to facilitate the removal of outer layers of a multi-layer filter medium to expose previously protected and unclogged layers of the filter medium. Since separate layers of the filter medium are to be removed, the filtration unit or filter cartridge is constructed so that each layer is individually sealed to air blocking or guiding structural components of the filters. Accordingly, as each layer is removed, no alternate fluid bypassing channels are exposed that would permit the ingress of unfiltered air to the point of use. As each layer is removed, means is provided to establish an end seal between the outer and next lower layer of the filter medium at the new free end of the filter medium. In addition to the stated features of filter construction, the invention further provides a separate disposable type of filtration unit that is of economic and efficient construction for convenient use on automobiles. This unit is of generally mold formed construction with the molded components providing a complete support structure for the filter and an efficient seal for each of the individual layers of the multi-layer filter medium.

The detailed features of this particular embodiment of the invention are shown in FIGS. 1, 2 and 3, wherein the numeral 11 indicates the filtration unit as a complete structure. This structure includes a top closure 12 and a bottom support 14 which provides a unitary throat 16. The top and bottom are spaced apart, and a filter element 15 is established therebetween. The filter element 15 is itself made up of multiple layers of a strip filter medium 21. The filter element 15 may be made up of a paper filter medium disposed in a convoluted and nested pattern with one layer about the next lower layer, or it may be constructed with a continuously overlaid winding of a single strip of filter medium, as illustrated.

The multiple layers of the filter medium 21 can serve to keep the top and bottom 12 and 14 in spaced apart position. In a modified construction, spaced apart posts 25 can be provided to maintain the separation, or a layer of screen wire (not shown) can be disposed about the outside of the filter element 15 and between the top 12 and bottom 14 to keep such components in desired relationship.

The type of filter medium 21 or paper used is illustrated in laid-out pattern in FIG. 4. This figure illustrates a pre-creased paper filter medium 21 which is alternately bent in opposite directions at the bend lines 22. This preformed paper can easily be disposed in a filter unit in the convoluted pattern shown in FIG. 1. As indicated, the filter medium may be placed in separate single circuit and closed loop layers, or a long strip of the filter medium paper 21 can be wound about itself in the convoluted pattern illustrated to provide the desired multi-layer filter element. Whichever mode of placement is used, the individual layers of the filter medium should be separately sealed to the top and bottom 12 and 14 so that removal of exterior layers will not create a fluid bypass into the center air delivery opening 23 of the filter unit 11.

In the filter unit 11 the top 12 and the bottom 14, inclusive of the throat construction 16, are preferably made of a plastic or rubber compound that may be conveniently mold formed. Where a moldable material is used, it is desirable that the filter element 15 be directly engaged by the mold formed components.

FIG. 3 illustrates a preferred type of construction in which each of the separate layers 31, 32, 33 and 34 of filter medium 21 are individually engaged by the mold formed components. In this illustrated embodiment the the filter medium 21 is of a type having adequate inherent structural strength to provide a good seal between the molded supports and the filter medium. The efficiency of this engagement is increased by the provision of a bent foot 36 at the edge of the filter medium so that the molded material may be disposed intimately about this portion of the filter layers.

The permanence and security of the seal between the filter element 15 and the support members can be improved by use of reinforcing tapes disposed along the edge 26 of the filter medium 21. Various types of fabric reinforced cellophane tape or other tapes may be used in the manner shown in FIGS. 5 and 6 to reinforce the filter medium edge 26. In FIG. 5 a single reinforcing edge layer 27 is provided, while in FIG. 6 an overlapping edge layer 28 is shown. In addition to these forms of reinforcing, it should be realized that reinforcing can be embodied directly in the filter medium 21. Reinforcing can be disposed uniformly throughout the entire filter medium, or it may be applied only at the edges. Where edge reinforcing of any type is used, it can serve other purposes in addition to the creation of a tighter seal between the filter element 15 and support members. The reinforcing will facilitate the selective removal of individual outer layers of the filter element 15 when it is desirable to remove such outer layer.

With the best combination of a filter medium 21, reinforcing components therefor, and with a proper selection of materials and shapes for the mold formed components 12 and 14, a simple and economic filtration unit may be provided. Costs of construction can be substantially reduced through practice of this invention so that such cartridge units may be considered individually disposable when the period of service use has terminated.

An individual cartridge unit as illustrated in FIG. 2 provided with a hose clamp type of securing device 37 on the throat 16 may be disposed directly about the barrel of an engine carburetor or other engine air intake. When emplaced and secured in place through use of the lock screw 38, the unit will give good and efficient air filter service. If after a period of use the outer layer of the filter element 15 becomes dust clogged, the entire outer layer or a portion thereof may be peeled away from the remaining filter layers to be discarded. Upon removal of any outside layer a new and relatively unclogged layer of the filter medium 21 will be exposed for continued usage. Removal of clogged outer layers will, of course, reduce the resistance to fluid flow through the filter element 15, and, accordingly, the air-to-fuel mixture ratio can be restored to the initial values thus re-establishing a proper carburetor setting. Maintenance of a somewhat constant draft characteristic over a long period of time can contribute to improved fuel economy.

For vehicles operating in extreme dust conditions the removal of exterior dust clogged layers of the filter element 15 can not only restore initial carburetor draft characteristics, but it can further serve to increase the dust protection for the engine. Where heavy dust conditions are allowed to clog a filter, the pressure differential across the filter is increased, and, accordingly, more of the dust retained on the exterior layers will be moved inwardly through succeeding layers, and a portion of the dust will eventually be induced into the engine. Where badly clogged exterior layers are removed, the excess pressure differential is avoided and less dust contamination may be passed by the filter 15 to the engine even though a reduced number of layers is used.

When portions of exterior layers of the filter medium are to be removed, it is important, however, that no alternate bypass fluid passage is established. Accordingly, the edges of each succeeding layer of the filter medium 21 must be sealed to structural components. It is also important that the end of the filter medium 21 be moved into a tightly engaging position with an underneath layer. Without such end seal an alternate passage could be established along the convoluted path formed between the layers of a continuous strip type construction. In order to effect this end seal and further to facilitate the removal of an unwanted exterior layer, the applicant provides a cutter bar and cam seal 41 and 42. As the outer layer is peeled away, it will be brought against the sharp edge 43 of the cutter bar 41 so that the filter medium 21 may be easily torn. Thereafter, cam roller 42 may be rotated about its support pin 44 so that the filter medium 21 can be pressed into engagement with the next lower layer of filter medium 21 adjacent the torn end 46. While two components are shown to facilitate the tearing and pressure sealing of the filter medium 21 at a free end, it should be obvious that these dual functions can be combined into a single element. The cutter bar 41 may itself be rotated about its pivot 45 from a cutting position as illustrated to a pressure exerting position approximately 180° therefrom to close off any passage or bypass for the unwanted ingress of air. In order to further facilitate the removal of the separate layers of the filter, perforations 48 as shown in FIG. 3 can be provided along the edge of the filter medium 21. If used, it is desirable that these perforations be disposed at a position that would be substantially covered by the mold formed top or bottom or by other sealing medium.

A separate but related embodiment of the invention is shown in FIGS. 7 and 8. FIG. 7 illustrates the use of features of this invention in connection with a replacement cartridge type of filter unit. In this type of unit, which is in widespread present usage, a container inclusive of a base 51 and a top cover 52 encloses a replaceable cartridge structural component 53 of torus shape disposed within the container in air sealed relationship against the bottom 51 and the cover 52 so that air introduced about the outer periphery 54 will have to pass through the filter element 55 before it is received centrally of the unit for delivery through a throat 56 to the engine air intake. The cartridge components for this type of filter may be made in a manner similar to that previously described. Each of the separate layers of the filter medium 21 may be engaged with the top and bottom structural component torus rings 62 and 64. The edges of the separate layers of the filter will be individually sealed in the top and bottom rings 62 and 64 in a manner similar to that perviously described. As in the previous instance, individual exterior layers may then be removed to expose underlying unclogged layers of the filter element 55.

FIGS. 7 and 8 further illustrate, however, another feature of the invention, inasmuch as it is here shown that the removable exterior layers do not have to be disposed in the same convoluted pattern. A removable prefilter 71 may be disposed in cylindrical arrangement about the conventional convoluted filter element 55. These outer cylindrical prefilter elements 71 may be formed of the same filter medium as the filter element 55, or they may be formed of other types of filter membrane or fine filter screen materials. It is still intended that a complete or partial outer layer of this auxiliary prefilter-screen element 71 can be removed at any time that it becomes clogged to expose relatively cleaner inner layers.

Where the filter element 55 and the prefilter 71 have separate or different filtration characteristics, a closer balance and control of the draft characteristics for a carburetor might be more easily obtainable. It should also be noted that the outer prefilter layers could likewise be disposed in a spiral path to obtain the desired multiple layer construction. As exterior layers are removed, the resultant outer layer could again be closed against the next adjacent inner layer to close off any bypass pathway for incoming air.

Alternately, the combined filter and prefilter type of unit shown in FIGS. 7 and 8 could be used without closing off the passageway between the spirally disposed prefilter layers. Dust entrained in any incoming air that would then course along the spiral pathway defined between the layers of the prefilter would have a tendency to settle out of the air stream due to the centrifugal motion of the flow pattern. If the passageway is gradually increased in size, the flow speed would likewise be reduced to assure further elimination of dust.

The bond between the side edges of the prefilter 71 or filter-screen element might not have to be as secure as that used and proposed for the filter elements 15 and 55. In fact, this exterior filter-screen element 71 could be made separately replaceable in order to assure a longer useful life for the filter element 55 itself.

Several additional features worthy of note are shown in the accompanying illustrations. FIG. 9 illustrates a type of end clip which can be used to seal the ends of a single layer of filter medium together. When an end clip, such as the clip 73, is used to complete a single filter medium layer, this clip can facilitate the removal of any layer of filter medium. It should also be noted that the face of the clip could be marked to indicate an intended removal interval. This removal interval could be different for each of the separate layers of the filter. A color coding could likewise be adopted so that users would known how many layers have been removed.

As another feature to facilitate the removal of individual filter layers, wires 74, as shown in FIG. 3, could be provided to facilitate the tearing of the filter medium away from its point of attachment in the filter supports. The wires could be glued or otherwise bonded to the filter medium 21.

While separate embodiments of the invention have been shown and described, it should be apparent that the ideas, concepts and structures presented are adaptable to various modifications and changes. All such modifications and changes coming within the scope of the appended claims are to be considered a part of this invention.

I claim:

1. In an air filtration unit of construction providing multiple layers of filter medium disposed across an air passage and one about the other in loosely spaced apart relationship for the removal of entrained dirt and dust carried by an air stream being moved through said filtration unit and filter medium, the improvement which comprises filter unit structural supports disposed in spaced apart relationship to at least in part define said air passage, said structural supports being formed for air excluding contact with opposed side edges of said filter medium at each layer thereof, and means positioned adjacent said upstream layer and disposed for contact with upstream layer of said filter medium and for the exertion of force thereagainst to move said upstream layer into tight contacting relationship with the next adjacent downstream layer to block any bypass air flow along a path between the layers of filter medium and moveable away therefrom whereby outer layers of said filter medium that have been exposed to dirt and dust may be serially removed to expose relatively unclogged inner layers.

2. Structure as set forth in claim 1 wherein said structural supports are of a moldable material with the material with the material of said supports being formed to engage the opposed side edges of said filter medium.

3. Structure as set forth in claim 2 wherein said structural supports are molded about the side edges of said filter medium.

4. Structure as set forth in claim 1 providing a complete filtration unit in which one of said structural supports provides a central opening and wherein the other of said structural supports is of closed configuration whereby the air passage is between said structural supports and through said opening.

5. Structure as set forth in claim 4 wherein said structural supports are of moldable material molded about the sides edges of said filter medium.

6. Structure as set forth in claim 5 and further comprising a foot element bent from the material of said filter medium at the side edges thereof wherein said structural supports are molded about said side edges and foot elements.

7. Structure as set forth in claim 1 wherein the multiple layers of said filter medium are derived from the spiral placement of a strip of filter medium wound about itself.

8. Structure as set forth in claim 1 wherein the means for contact with upstream layer of said filter medium is a cam element disposed adjacent to said filter medium.

9. Structure as set forth in claim 1 and further comprising a cutter element disposed between said structural supports and having a cutter edge for engagement against an upstream layer of said filter medium to facilitate the removal thereof.

10. Structure as set forth in claim 1 and further comprising a cutter edge on the upstream layer contact means to facilitate the removal of said filter medium.

References Cited

UNITED STATES PATENTS

| | | | |
|---|---|---|---|
| 2,279,423 | 4/1942 | Vokes | 210—493 |
| 2,378,839 | 6/1945 | Ensign et al. | 55—501 |
| 2,400,180 | 5/1946 | Venable | 55—498 |
| 2,463,723 | 3/1949 | Spraragen | 210—387 |
| 2,663,660 | 12/1953 | Layte | 55—497 |
| 2,675,127 | 4/1954 | Layte | 55—498 |
| 2,809,715 | 10/1957 | Lemkey | 55—486 |
| 3,042,571 | 6/1962 | Jackson | 210—493 |
| 3,104,966 | 9/1963 | Goulet et al. | 210—493 |
| 3,212,242 | 10/1965 | Florine | 55—150 |
| 3,295,681 | 1/1967 | Rubert et al. | 210—184 |

FOREIGN PATENTS

| | | |
|---|---|---|
| 1,228,236 | 3/1960 | France. |
| 536,071 | 5/1941 | Great Britain. |
| 1,018,379 | 1/1966 | Great Britain. |

HARRY B. THORNTON, *Primary Examiner.*

B. NOZICK, *Assistant Examiner.*